(12) United States Patent
Shao et al.

(10) Patent No.: US 10,497,943 B2
(45) Date of Patent: Dec. 3, 2019

(54) CORE-SHELL CATALYST AND METHOD FOR PALLADIUM-BASED CORE PARTICLE

(71) Applicant: Audi AG, Ingolstadt (DE)

(72) Inventors: Minhua Shao, Farmington, CT (US); Brandon Howard Smith, State College, PA (US)

(73) Assignee: Audi AG, Ingolstadt (DE)

( * ) Notice: Subject to any disclaimer, the term of this patent is extended or adjusted under 35 U.S.C. 154(b) by 0 days.

(21) Appl. No.: 14/649,145

(22) PCT Filed: Dec. 3, 2012

(86) PCT No.: PCT/US2012/067574
§ 371 (c)(1),
(2) Date: Jun. 2, 2015

(87) PCT Pub. No.: WO2014/088538
PCT Pub. Date: Jun. 12, 2014

(65) Prior Publication Data
US 2015/0372313 A1 Dec. 24, 2015

(51) Int. Cl.
*H01M 4/92* (2006.01)
*H01M 4/90* (2006.01)

(52) U.S. Cl.
CPC ........... *H01M 4/92* (2013.01); *H01M 4/9041* (2013.01)

(58) Field of Classification Search
CPC .............................. H01M 4/92; H01M 4/9041
See application file for complete search history.

(56) References Cited

U.S. PATENT DOCUMENTS

| | | |
|---|---|---|
| 4,163,736 A | 8/1979 | Acres et al. |
| 4,457,986 A | 7/1984 | Bindra et al. |
| 6,194,338 B1 | 2/2001 | Andolfatto et al. |
| 6,855,453 B2 | 2/2005 | Bett et al. |
| 6,936,564 B2 | 8/2005 | Butz et al. |
| 7,166,263 B2 | 1/2007 | Vanderspurt et al. |
| 7,311,754 B2 | 12/2007 | Virkar et al. |
| 7,612,011 B2 | 11/2009 | Vanderspurt et al. |
| 7,855,021 B2 * | 12/2010 | Adzic ................. H01M 4/8657 429/424 |

(Continued)

FOREIGN PATENT DOCUMENTS

| | | |
|---|---|---|
| JP | 2-204442 A | 8/1990 |
| JP | 2005-135900 A | 5/2005 |

(Continued)

OTHER PUBLICATIONS

Li, Meng, "Highly Porous Palladium Bulk: Preparation and Properties as Active Metal Material for Displacement Chromatographic Process", International Journal of Hydrogen Energy, 34 (2009) 1585-1589.*

(Continued)

*Primary Examiner* — Stewart A Fraser
*Assistant Examiner* — Victoria H Lynch
(74) *Attorney, Agent, or Firm* — Seed IP Law Group LLP

(57) ABSTRACT

A core-shell catalyst includes a porous, palladium-based core particle and a catalytic layer on the particle. The particle can be made by providing a precursor particle that has palladium interspersed with a sacrificial material. At least a portion of the sacrificial material is then removed such that the remaining precursor particle is porous.

23 Claims, 2 Drawing Sheets

(56) References Cited

U.S. PATENT DOCUMENTS

| | | | |
|---|---|---|---|
| 7,955,755 B2 | 6/2011 | McGrath et al. | |
| 7,972,437 B2 | 7/2011 | Alivisatos et al. | |
| 8,048,548 B2 | 11/2011 | Adzic et al. | |
| 8,227,372 B2 | 7/2012 | Lopez et al. | |
| 8,288,308 B2 | 10/2012 | Lopez et al. | |
| 8,304,362 B2 | 11/2012 | Lopez et al. | |
| 2006/0057440 A1 | 3/2006 | Ballantine et al. | |
| 2006/0112785 A1 | 6/2006 | Garbar et al. | |
| 2006/0134505 A1 | 6/2006 | Wang et al. | |
| 2006/0135359 A1 | 6/2006 | Adzic et al. | |
| 2007/0010396 A1 | 1/2007 | Giaquinta et al. | |
| 2007/0026292 A1 | 2/2007 | Adzic et al. | |
| 2007/0026294 A1 | 2/2007 | Shimazaki et al. | |
| 2007/0031722 A1 | 2/2007 | Adzic et al. | |
| 2008/0038615 A1 | 2/2008 | Son | |
| 2008/0107956 A1 | 5/2008 | Yoo et al. | |
| 2008/0206562 A1 | 8/2008 | Stucky et al. | |
| 2008/0286616 A1 | 11/2008 | Motupally et al. | |
| 2009/0035575 A1 | 2/2009 | Tsai et al. | |
| 2009/0053512 A1 | 2/2009 | Pyun et al. | |
| 2009/0061286 A1 | 3/2009 | Alexandrovichserov et al. | |
| 2009/0114061 A1 | 5/2009 | Strasser et al. | |
| 2009/0192030 A1 | 7/2009 | Myers et al. | |
| 2009/0203196 A1 | 8/2009 | Kim et al. | |
| 2009/0297913 A1 | 12/2009 | Zhang et al. | |
| 2009/0297924 A9 | 12/2009 | Shimazaki et al. | |
| 2010/0009338 A1 | 1/2010 | Zhang et al. | |
| 2010/0056366 A1 | 3/2010 | Lee | |
| 2010/0099012 A1 | 4/2010 | Adzic | |
| 2010/0177432 A1 | 7/2010 | Higashino | |
| 2010/0216632 A1* | 8/2010 | Adzic | H01M 4/8657 502/101 |
| 2010/0323274 A1 | 12/2010 | Ueno et al. | |
| 2011/0189589 A1* | 8/2011 | Erlebacher | B01J 21/02 429/523 |
| 2011/0275009 A1 | 11/2011 | Goto et al. | |
| 2012/0238442 A1 | 9/2012 | Lee | |
| 2012/0308916 A1 | 12/2012 | Shao et al. | |
| 2012/0316060 A1 | 12/2012 | Shao et al. | |

FOREIGN PATENT DOCUMENTS

| | | | | |
|---|---|---|---|---|
| JP | 2006-225211 A | 8/2006 | | |
| JP | 2010-221090 A | 10/2010 | | |
| JP | 47-33225 B1 | 7/2011 | | |
| JP | 2012-16684 A | 1/2012 | | |
| JP | 2012-35178 A | 2/2012 | | |
| WO | WO-2005067082 A2 * | 7/2005 | ......... | H01M 4/8605 |
| WO | 2011/081619 A1 | 7/2011 | | |
| WO | 2011/099956 A1 | 8/2011 | | |
| WO | WO 2011099956 A1 * | 8/2011 | ............. | H01M 4/92 |
| WO | WO 2011149912 A1 * | 12/2011 | ............. | B01J 13/02 |

OTHER PUBLICATIONS

Shao, Minhua, Core-shell catalysts consisting of nanoporous cores for oxygen reduction reaction, Phys. Chem. Chem. Phys., 2013, 15, 15078-15090 (Year: 2013).*

STIC search by A. Fraind on Jun. 12, 2017 (Year: 2017).*

Shao, Minhua, et al. "Pt Monolayer on Porous Pd—Cu Alloys as Oxygen Reduction Eelctrocatalysts", J. Am. Chem. Soc., 2010, 132, pp. 9253-9255. (Year: 2010).*

Humbert et al., "Synthesis and Characterization of Palladium-Platinum Core-Shell Electrocatalysts for Oxygen Reduction," *Electrocatal* 3:298-303, 2012.

International Search Report, dated Aug. 14, 2013, for International Application No. PCT/US2012/067574, 2 pages.

Adzic et al., "Platinum Monolayer Fuel Cell Electrocatalists," *Top Catal* 46:249-262, 2007.

Brown et al., *Chemistry: The Central Science*, 12$^{th}$ Edition, Prentice Hall, Columbus, OH, United States, 2012, Chapter 4, Reactions in Aqueous Solution, p. 136, 3 pages.

Chen et al., "Alkanethiolate-Protected Copper Nanoparticles: Spectroscopy, Electrochemistry, and Solid State Morphological Evolution," *J. Phys. Chem. B* 105:8816-8820, 2001.

Chen et al., "Hollow Platinum Spheres with Nano-Channels: Synthesis and Enhanced Catalysis for Oxygen Reduction," *J Phys. Chem. C* 112:7522-7526, 2008.

International Search Report and Written Opinion of the International Searching Authority, for International Application No. PCT/US2010/000411, dated Oct. 27, 2010, 10 pages.

International Search Report and Written Opinion of the International Searching Authority, for International Application No. PCT/US2010/000414, dated Oct. 28, 2010, 8 pages.

International Search Report and Written Opinion of the International Searching Authority, for International Application No. PCT/US2010/000415, dated Oct. 26, 2010, 6 pages.

Koh et al., "Electrocatalysis on Bimetallic Surfaces: Modifying Catalytic Reactivity for Oxygen Reduction by Voltammetric Surface Dealloying," *J. Am. Chem. Soc* 129:12624-12625, 2007.

Lim et al., "Pd—Pt Bimetallic Nanodendrites with High Activity for Oxygen Reduction," *Science* 324:1302-1305, 2009.

Lu et al., "Galvanic replacement reaction: a simple and powerful route to hollow and porous metal nanostructures," *Proceedings of the Institution of Mechanical Engineers, Part N: Journal of Nanoengineering and Nanosystems* 2008, 17 pages.

Peng et al., "Designer platinum nanoparticles: Control of shape, composition in alloy, nanostructure and electrocatalytic property," *Nano Today* 4:143-164, 2009.

Xu et al., "Nanotubular Mesoporous Bimetallic Nanostructures with Enhanced Electrocatalytic Performance," *Adv. Mater.* 21:2165-2169, 2009.

Zhang et al., "Platinum Monolayer Elecrocatalusts for $O_2$ Reduction: Pt Monolayer on Pd(111) and on Carbon-Supported Pd Nanoparticles," *J. Phys. Chem B* 108:10955-10964, 2004.

Landgrebe et al., "Power Sources for Transportation Applications: Proceedings of the International Symposium," *Electrochemical Society*, 2003, p. 220.

Li et al., "Palladium core-porous silica shell-nanoparticles for catalyzing the hydrogenation of 4-carboxybenzaldehyde," Catalysis Communications, Jul. 20, 2008, vol. 9, Issue 13, pp. 2257-2260.

* cited by examiner

CORE-SHELL CATALYST AND METHOD FOR PALLADIUM-BASED CORE PARTICLE

BACKGROUND

This disclosure relates to a high activity catalyst for use in electrochemical or other catalytic devices.

Electrochemical devices are commonly used for generating electric current. For example, an electrochemical device may include an anode catalyst, a cathode catalyst, and an electrolyte between the anode and cathode catalyst, for generating an electric current in a known electrochemical reaction between reactants. One issue encountered with electrochemical devices is the operational efficiency of the catalyst. For example, electrochemical activity at the cathode catalyst is one parameter that controls the efficiency. An indication of the electrochemical activity is the rate of electrochemical reduction of the reactant at the cathode catalyst. Platinum has been used for the catalyst. For example, platinum has been alloyed with other metals to produce ternary or quaternary alloys with enhanced catalytic activity and stability. Platinum has also been dispersed on core particles to form what is known as a core-shell catalyst.

SUMMARY

A core-shell catalyst includes a porous, palladium-based core particle and a catalytic layer on the particle. The particle can be made by providing a precursor particle that has palladium interspersed with a sacrificial material. At least a portion of the sacrificial material is then removed such that the remaining precursor particle is porous.

Also disclosed is a method of making a core-shell catalyst. The method includes identifying a target surface area for a core-shell catalyst and forming a porous, palladium-based core particle in response to the target surface area such that the porous, palladium-based core particle has the target surface area. A catalytic layer is then deposited on the porous, palladium-based core particle to form the core-shell catalyst with the target surface area. The higher the surface area, the more the platinum can be deposited on the core. A high fuel cell performance requires a higher platinum loading and low transition metal loading for a core-shell catalyst. The surface area and amount of transition metal can be well controlled by the disclosed method.

DETAILED DESCRIPTION

Figure 1A:
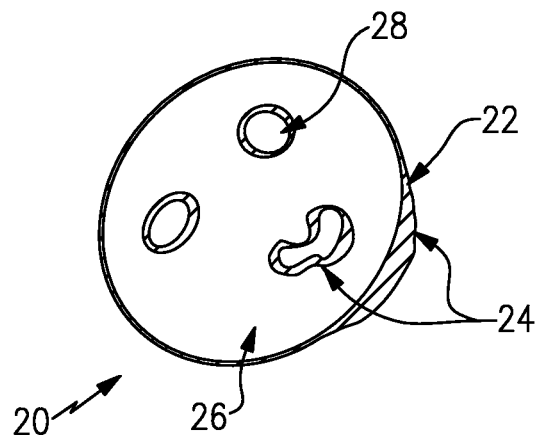
FIG. 1A shows an example core-shell catalyst.
Figure 1B:
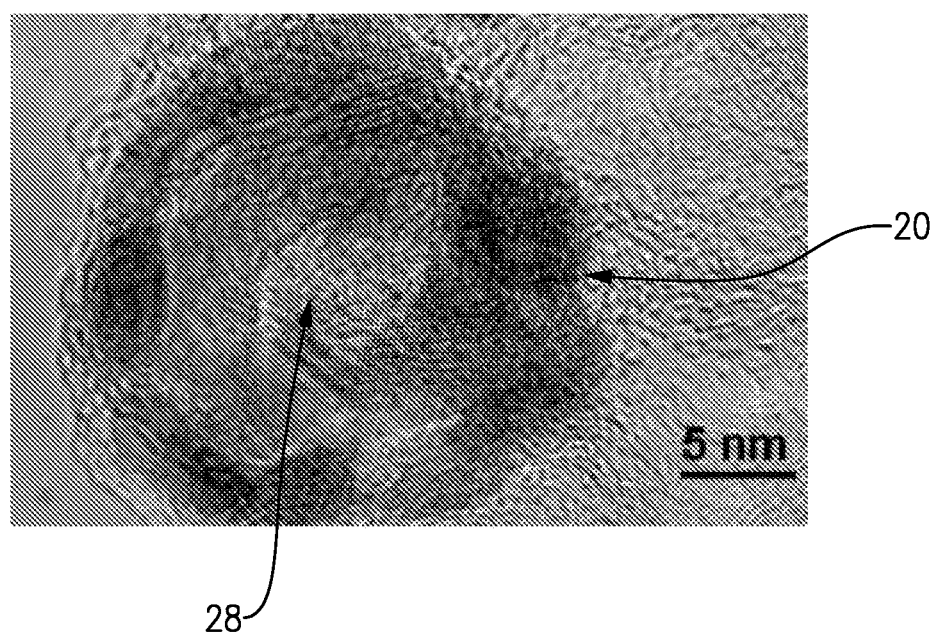
FIG. 1B shows a TEM image of a portion of a core-shell catalyst.

FIG. 1A schematically shows an example core-shell catalyst 20 and FIG. 1B shows a TEM image of a portion of the core-shell catalyst 20. As can be appreciated, the core-shell catalyst 20 can be used in electrochemical devices or other devices that would benefit therefrom. As will be described in further detail, the core-shell catalyst 20 includes a structure and materials that provide enhanced electrochemical activity.

The core-shell catalyst 20 includes a porous, palladium-based core particle 22 ("particle 22") and a catalytic layer 24 on the particle 22. The porosity of the particle 22 provides a greater amount of free surface area for the catalytic layer 24, which may infiltrate into the particle 22 and coat the internal surfaces thereof. The particle 22 includes a solid, continuous lattice structure 26 (represented by the white portions) and an open porosity 28. The open porosity 28 extends throughout the bulk of the particle 22. In one example, the particle 22 has a porosity of 20% or greater. In another example, the particle 22 has a porosity of 50% or greater.

The particle 22 is palladium-based and therefore includes palladium as the major metallic constituent. In one example, the particle 22 has only palladium, to the exclusion of other metals in greater than trace impurity amounts. In another example, the particle 22 includes palladium as the major metallic constituent and at least one transition metal. The transition metal or metals can include any element in groups 3-12 of the Periodic Table, actinide elements and lanthanide elements. Optionally, the particles 22 can also include carbon-based materials, such as carbon black.

The amount and type of transition metal that is used serves to modify the atomic lattice structure of the palladium, which in turn influences the electrochemical activity of the core-shell catalyst 20. In one example, the transition metal includes nickel. In a further example, the particle 22 includes only palladium and nickel, to the exclusion of other elements in greater than trace impurity amounts.

The composition of the catalyst layer 24 can be selected for the intended end use of the core-shell catalyst 20. In one example, the catalyst layer 24 includes platinum, but alternatively or additionally can also include other metals. In a further example, the catalyst layer 24 is a platinum monolayer. A monolayer is approximately one atom thick. However, although the monolayer is generally of uniform thickness, it is to be understood that some portions may be thinner (submonolayer) or thicker (several atoms thick).

In a further example, the atomic lattice structure of the palladium of the particle 22 is modified by the addition of the one or more transition metals to enhance the electrochemical activity of the catalyst layer 24. In one example, the particle 22 has a ratio, by weight, of the amount of palladium to the amount of the one or more transition metals of 10:1 or greater. In a further example based on using platinum as the catalyst layer 24 and nickel as the transition metal in the particle 22, the ratio by weight of palladium to nickel is 20:1 or greater or is 30:1 or greater.

Figure 2:
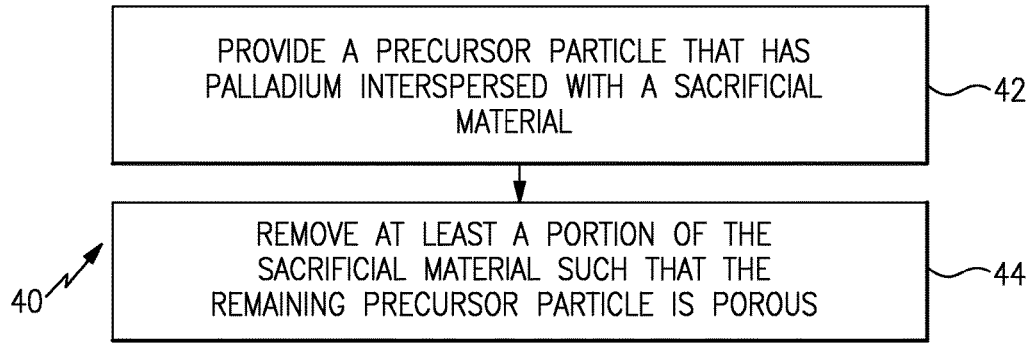
FIG. 2 shows an example method of making a porous, palladium-based core particle.

FIG. 2 shows an example method 40 of making the porous, palladium-based core particle 22 as described herein. The method 40 includes at step 42 providing a precursor particle that has palladium interspersed with a sacrificial material. At step 44, at least a portion of the sacrificial material is removed such that the remaining precursor particle is porous (i.e., the porous, palladium-based core particle 22). For example, the sacrificial material is removed by acid washing using an acid that has a greater reactivity with the sacrificial material than with the palladium.

In a further example, the sacrificial material is the one or more transition metals of the particle 22. For instance, the precursor particle includes the palladium and the one or more transition metals. The one or more transition metals are provided in the precursor particle in an amount that is greater than the desired amount in the particle 22. A portion of the one or more transition metals are then removed (i.e., "dealloyed") to create the porosity in the particle 22. Thus, by volume, the initial amount of the one or more transition metals in the precursor particle is also greater than the created porosity because a portion of the one or more transition metals remains as a lattice-modifying agent in the particle 22 after the removal step 44 is completed.

In further examples, the method 40 utilizes either of two methodologies to provide the precursor particle, including an impregnation technique and a co-reduction technique. In the impregnation technique, solid palladium particles are mixed with a salt of the one or more transition metals. The salt is then reduced such that the one or more transition metals impregnate into the solid palladium particles to form the palladium interspersed with the one or more transition metals. At least the portion of the transition metal that is impregnated into the solid palladium particles is then removed to form the particle 22.

Alternatively, in the co-reduction technique, a palladium salt and a salt of the one or more transition metals are co-reduced to form the palladium interspersed with the one or more transition metals before then removing at least a portion of the transition metals to form the particle 22. In either of the techniques, impregnation or co-reduction, the precursor particle can be subjected to a heat treatment to facilitate interspersion of the palladium and the sacrificial material. The following examples further illustrate details of each of the techniques.

Example 1: Impregnation Technique; 60° C. 1 M $HNO_3$ Acid Washing Procedure for $PdNi_6$/C 1) Add 1 g of 35% Pd/C to a 100 mL beaker with 50 mL ultrapure water, ultrasonicate and stir for 30 min
2) Dissolve the required amount of nickel nitrate hexahydrate in 25 mL water to achieve 1:6 molar ratio of Pd:Ni and add the precursor solution to the Pd/C dispersion
3) Stir the suspension on a stir plat and heat it to 95° C. until most of water evaporates to form a dense slurry or moist solids
4) Dry in a vacuum oven at 80° C. for a couple of days
5) Scrape the powder from beaker and grind with mortar and pestle and allow it to stand overnight in desiccator
6) Place 2 g of the powder in a ceramic or quartz boat and put it into a tube furnace
7) Heat to 400° C. in 2 hours in 4% $H_2$/argon and hold for 1 hour in argon
8) Heat to 700° C. in 1 hour in argon and hold for 4 hours in argon, and allow to cool to room temperature
9) Grind the catalyst ($PdNi_6$/C) with mortar and pestle
Acid Washing Step 1:
1) Add 800 mg $PdNi_6$/C to a 250 mL beaker with 230 mL ultrapure water, ultrasonicate and stir for 30 min; Transfer the $PdNi_6$/C suspension to a 500 mL round bottomed flask
2) Place the flask in a 60° C. water bath and keep stirring at 500 rpm
3) Add 172 mL preheated 60° C. 2.3 M $HNO_3$ into the flask quickly and keep stirring for 1.58 hours
4) Filter out the solids
Acid Washing Step 2:
1) Re-disperse the solids in 170 mL ultrapure water, ultrasonicate and stir for 30 min
2) Transfer the solids to a 250 mL round bottomed flask
3) Place the flask in a 60° C. water bath and keep stirring at 500 rpm
4) Add 47 mL preheated 60° C. 0.5 M $H_2SO_4$ into the flask quickly and keep stirring for 4-9 hours
5) Filter out the solids and wash the solids five times with 400 mL portions of ultrapure water
6) Dry the solids in a vacuum oven at 60° C. overnight; Grind the catalyst with mortar and pestle
7) Usually example 1 results in a porous core with Pd to Ni weight ratio about 20-30; Perform additional dealloying 60° C. 0.5 M $H_2SO_4$ as needed based on composition from ICP results if Ni content is too high To generate a porous structure, the first step in the acid washing is to create pores using diluted $HNO_3$ solution at various temperatures. The higher the temperature, the shorter the time needed. The second step is to further remove Ni from the core using diluted $H_2SO_4$ at various temperatures. If only $H_2SO_4$ is used in both steps, the porous structure is not formed, resulting in a low surface area.

Example 2: 50° C. 1 M $HNO_3$ Acid Washing Procedure for $PdNi_6$/C from the Impregnation Method 1) Add 800 mg $PdNi_6$/C to a 250 mL beaker with 230 mL ultrapure water, ultrasonicate and stir for 30 min; Transfer the $PdNi_6$/C suspension to a 500 mL round bottomed flask
2) Place the flask in a 50° C. water bath and keep stirring at 500 rpm
3) Add 172 mL preheated 50° C. 2.3 M $HNO_3$ into the flask quickly and keep stirring for 5 hours
4) Filter out the solids
Acid Washing Step 2:
1) Re-disperse the solids in 170 mL ultrapure water, ultrasonicate and stir for 30 min
2) Transfer the solids to a 500 mL round bottomed flask
3) Place the flask in a 50° C. water bath and keep stirring at 500 rpm
4) Add 180 mL preheated 50° C. 1 M $HNO_3$ saturated with $Pd(NO_3)_2$ into the flask quickly and keep stirring for 8.5 hours
5) Filter out the solids and wash the solids five times with 400 mL portions of ultrapure water
6) Dry the solids in a vacuum oven at 60° C. overnight; Grind the catalyst with mortar and pestle
7) Usually example 2 results in a porous core with Pd to Ni weight ratio about 20-30; Perform additional dealloying of step 2 as needed based on composition from ICP results if Ni content is too high Example 3: Co-Reduction Technique; 80° C. 0.5 M $H_2SO_4$ Acid Washing Procedure for $PdNi_6$/C from the Co-reduction Method 1) Add 600 mg sieved Ketjen Black carbon support to a 1 L beaker in 600 mL ultrapure water, ultrasonicate and stir for 30 min
2) Add 1 g palladium nitrate hydrate and 6.56 g nickel nitrate hexahydrate while stirring at 400 RPM
3) Add 14.47 g PVP slowly to achieve a PVP-to-metal molar ratio of 0.1:1 (adjust stirring rate as needed to dissolve the PVP) and stir for 30 minutes
4) Add $NaBH_4$ solution (5.97 g in 100 mL water) dropwise into the mixture
5) Stir for 1 hour after adding the $NaBH_4$ solution at 800 RPM
6) Filter the solution and wash with 3 L of ultrapure water
7) Dry solids under a vacuum at 60° C. overnight or until dry
8) Passivate the solids using≈1-2% $O_2/N_2$ stream to prevent burning of the catalyst after it cools down (to avoid burning carbon)
9) Grind up solids once dry and record total weigh 10) Heat the catalyst to 700° C. in 1 hour and hold for 4 hours in argon 11) Cool to room temperature and grind the catalyst with mortar and pestle Acid washing step 1:

1) Add 1.25 g PdNi$_6$/C to a 600 mL beaker with 490 mL ultrapure water, ultrasonicate and stir for 30 min; Transfer the PdNi$_6$/C suspension to a 500 mL round bottomed flask 2) Place the flask in a 80° C. water bath and keep stirring at 500 rpm 3) Add 135 mL preheated 80° C. 2.3 M H$_2$SO$_4$ into the flask quickly and keep stirring for 5 hours 4) Filter out the solids Acid Washing Step 2:

1) Re-disperse the solids in 196 mL ultrapure water, ultrasonicate and stir for 30 min 2) Transfer the solids to a 500 mL round bottomed flask 3) Place the flask in a 80° C. water bath and keep stirring at 500 rpm 4) Add 47 mL preheated 80° C. 0.5 M H$_2$SO$_4$ into the flask quickly and keep stirring for 1.5-2 hours 5) Filter out the solids and wash the solids five times with 400 mL portions of ultrapure water 6) Dry the solids in a vacuum oven at 60° C. overnight; Grind the catalyst with mortar and pestle 7) Usually example 3 results in a porous core with Pd to Ni weight ratio about 20-30. Perform additional dealloying 80° C. 0.5 M H$_2$SO$_4$ as needed based on composition from ICP results if Ni content is too high Acid Washing Step 2:

1) Re-disperse the solids in 196 mL ultrapure water, ultrasonicate and stir for 30 min 2) Transfer the solids to a 500 mL round bottomed flask 3) Place the flask in a 80° C. water bath and keep stirring at 500 rpm 4) Add 47 mL preheated 80° C. 0.5 M H$_2$SO$_4$ into the flask quickly and keep stirring for 2-2.5 hours 5) Filter out the solids and wash the solids five times with 400 mL portions of ultrapure water 6) Dry the solids in a vacuum oven at 60° C. overnight; Grind the catalyst with mortar and pestle 7) Usually example 4 results in a porous core with Pd to Ni weight ratio about 20-30. Perform additional dealloying 80° C. 0.5 M H$_2$SO$_4$ as needed based on composition from ICP results if Ni content is too high The Table below presents a summary of the materials, synthesis method, formation technique and resulting electrochemical area of the particle 22 in comparison to a reference catalyst particle of palladium deposited onto a carbon support. In the Table, "ICP (%)" refers to the composition by weight percentage as determined by a known inductively coupled plasma technique, where the balance of the composition is carbon-based material. From the table, it is clear that If only H$_2$SO$_4$ is used in both steps for the samples prepared from impregnation method, the porous structure is not formed resulting in a low surface area.

TABLE

Experimental Summary

| Materials | Alloy synthesis Methods | Protocol 1st step | ICP (%) | 2nd Step | ICP (%) | Electrochemical surface area m$^2$/g (Pd) |
|---|---|---|---|---|---|---|
| PdNi6/C | Impregnation | 0.5M H$_2$SO$_4$, 80° C., 5 hour | Pd: 32 Ni: 15 | 0.5M H$_2$SO$_4$, 80° C., 4 hour | Pd: 38 Ni: 1.2 | 22 (not porous) |
| | | 1M HNO$_3$, 50° C., 5 hour | Pd: 33 Ni: 12 | 0.5M H$_2$SO$_4$, 80° C., 5 hour | Pd: 35 Ni: 1.1 | 39 |
| | | 1M HNO$_3$, 50° C., 5 hour | Pd: 33 Ni: 12 | saturated Pd(NO$_3$)2, 1M HNO$_3$, 50° C., 8.5 hour | Pd: 39 Ni: 1.5 | 55 |
| | | 1M HNO$_3$, 60° C., 1.58 hour | Pd: 30 Ni: 29 | 0.5M H$_2$SO$_4$, 60° C., 9 hour | Pd: 38 Ni: 1.2 | 50 |
| | Co-reduction | 0.5M H$_2$SO$_4$, 80° C., 5 hour | Pd: 31 Ni: 8 | 0.5M H$_2$SO$_4$, 80° C., 1.5-2 hour | Pd: 26 Ni: 1.2 | 40 |
| | | 1M HNO$_3$, 20° C., 6.5 hour | Pd: 28 Ni: 5 | 0.5M H$_2$SO$_4$, 80° C., 2-2.5 hour | Pd: 22 Ni: 1.1 | 50 |
| | | 1M HNO$_3$, 20° C., 6.5 hour | Pd: 26-29, Ni: 4-6 | saturated Pd(NO$_3$)2, 1M HNO$_3$, 20° C., 8 hour | Pd: 27 Ni: 1.5 | 60 |
| Reference Pd/C | N/A | N/A | Pd: 33 | N/A | Pd: 33 | 62 (not porous) |

Figure 3:
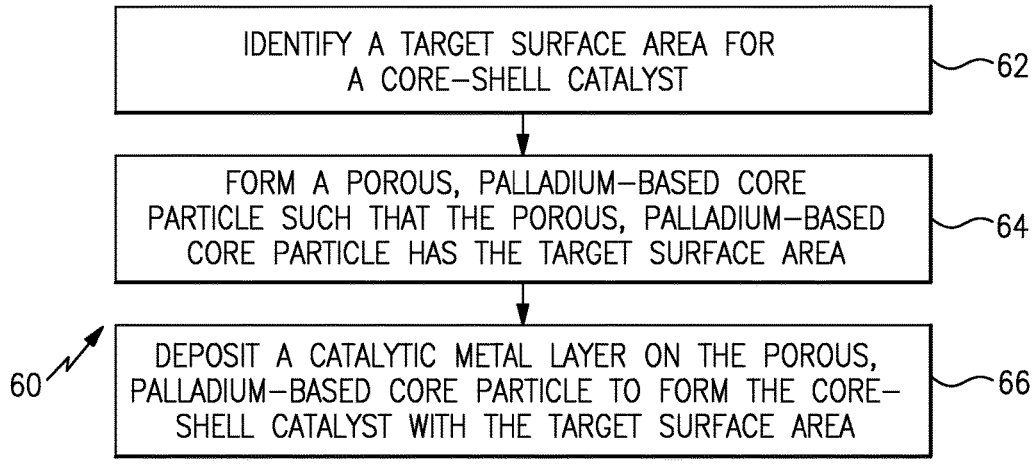
FIG. 3 shows an example method of making a core-shell catalyst.

Example 4: 25° C. 1 M HNO$_3$ Acid Washing Procedure for PdNi$_6$/C from the Co-reduction Method Acid washing step 1:

1) Add 1.25 g PdNi$_6$/C to a 600 mL beaker with 490 mL ultrapure water, ultrasonicate and stir for 30 min; Transfer the PdNi$_6$/C suspension to a 500 mL round bottomed flask 2) Add 135 mL 2.3 M HNO$_3$ into the flask quickly and keep stirring for 6.5 hours 3) Filter out the solids FIG. 3 illustrates a further example method 60 of making a core-shell catalyst 20. As can be appreciated from the prior described method 40, the amount of sacrificial material used in the precursor particle can be adjusted to provide a particle 22 with a desired, target surface area. The method 60 includes at step 62 identifying a target surface area for the core-shell catalyst 20. For example, the target surface area may vary depending upon the intended end use of the core-shell catalyst 20. At step 64 the porous, palladium-based core particle 22 is formed in response to the identification of the target surface area such that the particle 22 has the target surface area. At step 66, the catalytic layer 24 is deposited on the particle 22 to thereby form the core-shell catalyst 20 with the target surface are. Techniques for depositing such catalytic layers on core particles are known and the details are therefore not set forth in this disclosure.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A core-shell catalyst comprising:
    a porous, palladium-based core particle comprising nickel interspersed with palladium throughout the core particle, the porous, palladium-based core particle having a ratio, by weight, of palladium to nickel that is 10:1 or greater, and having an exposed surface area including internal exposed surfaces; and
    a catalytic layer coating the exposed surface area including the internal exposed surfaces of the core particle, the catalytic layer having an electrochemical surface area including internal electrochemical surfaces.

2. The core-shell catalyst as recited in claim 1, wherein the porous, palladium-based core particle further comprises at least one additional transition metal.

3. The core-shell catalyst as recited in claim 2, wherein the at least one additional transition metal is selected from the group consisting of titanium, vanadium, chromium, manganese, cobalt, iron, copper, zinc and molybdenum.

4. The core-shell catalyst as recited in claim 1, wherein the ratio is 20:1 or greater.

5. The core-shell catalyst as recited in claim 1, wherein the ratio is 30:1 or greater.

6. The core-shell catalyst as recited in claim 1, wherein the electrochemical surface area including the internal electrochemical surfaces is 20 meters squared per gram or greater.

7. The core-shell catalyst as recited in claim 1, wherein the electrochemical surface area including the internal electrochemical surfaces is 30 meters squared per gram or greater.

8. The core-shell catalyst as recited in claim 1, wherein the electrochemical surface area including the internal electrochemical surfaces is 50 meters squared per gram or greater.

9. The core-shell catalyst as recited in claim 1, wherein the catalytic layer is a platinum monolayer.

10. The core-shell catalyst as recited in claim 1, wherein the porous, palladium-based core particle has a porosity of 20% or greater.

11. A method of making a palladium-based core particle for a core-shell catalyst, the method comprising:
    (a) providing a precursor particle that has palladium interspersed with nickel; and
    (b) removing at least a portion of the nickel such that the remaining precursor particle has a ratio, by weight, of palladium to nickel that is 10:1 or greater, and has an exposed surface area including internal exposed surfaces, the exposed surface area available for coating with a catalytic layer to produce an electrochemical surface area including internal electrochemical surfaces.

12. The method as recited in claim 11, wherein the precursor particle includes at least one additional transition metal.

13. The core-shell catalyst as recited in claim 12, wherein the at least one additional transition metal is titanium, vanadium, chromium, manganese, cobalt, iron, copper, zinc or molybdenum.

14. The method as recited in claim 11, further including selecting amount of the nickel in the precursor particle in response to a target, desired amount of porosity in the remaining precursor particle.

15. The method as recited in claim 14, wherein the amount, by volume, of the nickel in the precursor particle is greater than the target, desired amount of porosity in the remaining precursor particle such that a portion of the nickel remains in the precursor particle after the removing step is completed.

16. The method as recited in claim 11, wherein said step (a) includes providing a non-porous palladium particle and infusing the non-porous palladium particle with the nickel.

17. The method as recited in claim 11, wherein said step (a) includes providing a palladium salt and a salt of the nickel, and reducing the palladium salt and the salt of the nickel to form the precursor particle.

18. The method as recited in claim 11, wherein said step (a) includes subjecting the precursor particle to a heat treatment to intersperse the palladium and the nickel.

19. The method as recited in claim 11, wherein said step (b) includes using an acid to create the pores and remove the nickel.

20. The method as recited in claim 19, wherein the acid is selected from the group consisting of nitric acid, sulfuric acid, perchloric acid and acetic acid.

21. The method as recited in claim 19, wherein step (b) is conducted at a temperature of up to 90° C.

22. The method as recited in claim 19, including two or more steps of acid washing.

23. A method of making a core-shell catalyst, the method comprising:
    identifying a target electrochemical surface area for a core-shell catalyst, the electrochemical surface area including internal electrochemical surfaces;
    forming a porous, palladium-based core particle in response to the identifying of the target electrochemical surface area, such that the porous, palladium-based core particle has an exposed surface area including internal exposed surfaces available for coating with a catalyst to produce the target exposed electrochemical surface area; and
    forming the core-shell catalyst with the target electrochemical surface area by depositing a layer of the catalyst on the porous, palladium-based core particle.

* * * * *